April 27, 1971 E. M. FENNIMORE ET AL 3,576,722

METHOD FOR METALIZING CERAMICS

Filed March 26, 1969

INVENTORS
ELLSWORTH M. FENNIMORE
GERARDO A. RITACCO

BY

ATTORNEY

United States Patent Office 3,576,722 Patented Apr. 27, 1971

3,576,722
METHOD FOR METALIZING CERAMICS

Ellsworth M. Fennimore, Bloomfield, and Gerardo A. Ritacco, Belleville, N.J., assignors to The Bendix Corporation Filed Mar. 26, 1969, Ser. No. 810,764
Int. Cl. B44d *1/18;* C23b *5/48;* B29c *17/08*
U.S. Cl. 204—15 15 Claims

ABSTRACT OF THE DISCLOSURE

A method for applying intricate electroconductive metallic patterns to a ceramic substrate. A refractory metal is applied to the substrate, and over which refractory metal are applied successive layers of a primary electroconductive metal. A pattern is applied to the primary metal and a final electroconductive metal is applied over the pattern. By using selective etchants all metals outside of the pattern are removed to expose the substrate.

BACKGROUND OF THE INVENTION

Field of the invention

This invention relates to methods for metalizing ceramics and, more particularly, to a method for applying intricate electroconductive metallic patterns to a ceramic substrate.

DESCRIPTION OF THE PRIOR ART

The wide and relatively recent acceptance of microcircuitry requires that intricate metallic patterns be applied to ceramic substrates. Conventional methods such as, for example, silk screening, while performing the task, do not have the capability for providing the desired accuracy and pattern intricacy. While it was realized that photoetching provides a satisfactory solution to the problem, it was left for the present invention to provide a workable method for performing the task.

SUMMARY OF THE INVENTION

The method of the invention includes the steps of vacuum depositing a refractory metal (titanium) over a ceramic (aluminum oxide) substrate. A layer of a primary electroconductive metal (copper) is vacuum deposited over the refractory metal and additional primary electroconductive metal is electroplated over said layer. A pattern is applied to the primary electroconductive metal and a final electroconductive metal (gold) is electroplated over the pattern.

The main object of this invention is to provide a method for metalizing a ceramic substrate.

Another object of this invention is to provide a method for applying electroconductive metallic patterns to ceramic substrates, and which method provides patterns having intricacies not heretofore obtainable.

Another object of this invention is to provide the pattern by applying successive layers of refractory and primary electroconductive metals to the substrate, applying the pattern to the primary electroconductive metal layer and applying a final electroconductive metal layer over the pattern.

Another object of this invention is to use vacuum deposition and electroplating for applying the metallic layers and photoetching for applying the pattern.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
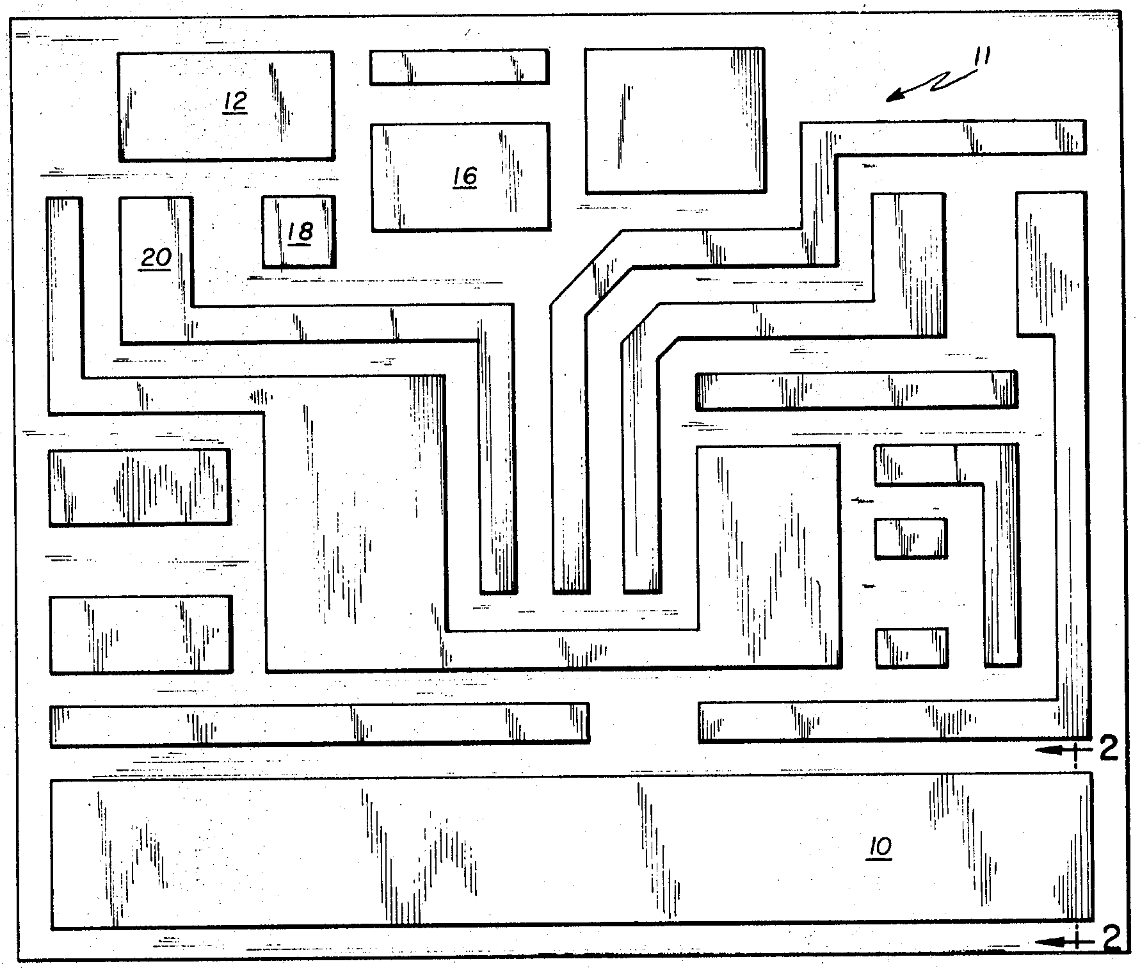
FIG. 1 is a plan view showing a typical metalized ceramic substrate provided according to the method of the invention.
Figure 2:
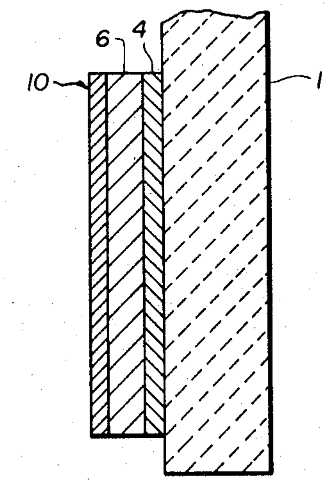
FIG. 2 is a partial sectional view taken along the line 2—2 of FIG. 1 and showing the ceramic substrate and the metallic layers applied thereto according to the invention.

The ceramic substrate according to the invention may be, for purposes of illustration, an aluminum oxide blank approximately two inches by two inches and 0.015 inch thick, and which blank carries the numerical designation 1 in FIGS. 1 and 2. Ceramic substrate 1 is initially cleaned by scrubbing with a nylon brush in a commercially available detergent-type alkaline cleaner after which the substrate is baked at 250° F. for one-half hour to drive off moisture.

A thin film of a refractory metal such as titanium is next applied to ceramic substrate 1. The titanium film is applied by vacuum deposition accomplished through sputtering or, in the preferred embodiment of the invention, by evaporation using an electron beam gun. These techniques are well known in the art and are described in the December 1967 issue of Semi-Conductor Products and Solid State Technology, published by the Cowan Publishing Co., Port Washington, N.Y.

It will suffice to say for purposes of describing the present invention that sputtering is accomplished by adding a small amount of an inert gas such as argon to an otherwise evacuated chamber containing a titanium cathode and ceramic substrate 1. When a negative charge is applied to the cathode, a plasma of electrons and positive argon ions forms and bombards the cathode dislodging titanium atoms which condense as an adherent film on the substrate. Electron beam evaporation, on the other hand, is accomplished by heating the surface of the evaporant (titanium) in a high vacuum using an electron beam gun. Electrons are thus accelerated through potentials in the range of approximately 3 to 6 kv. and focused into a beam for providing sufficient power to melt the titanium. The combination of high vacuum ($2\times10^{-5}$ mm. Hg) and electron beam heating permits titanium deposition with minimum contamination and is therefore a distinctly advantageous form of applying the titanium film and particularly satisfies the requirements of the invention.

It has been found by practicing the invention that by depositing titanium as noted above for a period of about 3 minutes, a film having a thickness of approximately 10 millionths of an inch is provided, and which film is designated by the numeral 4 in FIG. 2. In this connection it is to be noted that a guide as to the amount of titanium applied is provided by simultaneously processing a glass slide and noting the gradual increase in reflectivity thereof as the metal is deposited.

A primary electroconductive metal film 6 of copper is applied over titanium film 4 in two steps. The first step involves vacuum deposition by evaporation using direct resistance heating techniques. It will be understood that vacuum deposition is required to provide initial adhesion between the titanium and copper and thereafter a second step involving more expedient and well practiced electroplating methods increases the thickness of the copper film.

Direct resistance evaporation involves heating a filament (usually of refractory metal) in a high vacuum ($2\times10^{-5}$ mm. Hg) and melting the copper therewith. When the copper becomes molten the heat is significantly reduced to maintain uniform copper evaporation. It has been found by practicing the invention that an evaporation cycle of approximately 2 minutes provides a copper film approximately 50 millionths of an inch thick. As was the case for the titanium deposition, a guide as to the amount of copper applied is obtained by simultaneously processing a glass slide and noting the gradual increase in reflectivity thereof as copper is deposited.

In order to insure proper adhesion between the copper and titanium, the metalized substrate is next "fired." This is accomplished by heating the substrate in a furnace, and which furnace is initially at room temperature. Hydrogen is introduced into the furnace to inhibit oxidation of the copper and the furnace temperature is raised to 1,000° F., being maintained thereat for a period of 1 hour. The substrate is furnace cooled to room temperature to complete the firing process.

Ceramic substrate 1 is next cleaned in preparation for electroplating by brushing with a nylon brush in a suitable solution of pumice and water, after which the substrate is rinsed in water and allowed to dry. The substrate is then immersed in a commercially available acid based cleaner for about 30 seconds. For purposes of illustration it has been found that a cleaner manufactured by the MacDermid Co. of Waterbury, Conn., and carrying the trade designation "Metex L–5" is suitable for the purposes intended.

The substrate is next gently swabbed with a soft nylon brush, redipped in "Metex L–5" and allowed to drain for a few seconds. Cleaning continues with a rinse in warm water and a double rinse in cold water, and thereafter immersion in a 50% solution of hydrochloric acid for one minute to remove any residue lingering from the above noted cleaning. The substrate is next rinsed in cold water and then immersed in a 10% sodium cyanide solution for 15–20 seconds.

It is to be noted that the above described cleaning step, as well as all cleaning steps referred to herein, must be performed with the utmost diligence in order to insure the results intended by the invention.

The electroplating step commences when a copper strike is applied to the substrate by immersing it in a copper cyanide solution for 1 to 2 minutes. The substrate is suitably rinsed in water and copper plated in a copper pyrophosphate bath by conventional methods well known in the art to provide copper film 6 having a thickness of from 2 to 5 ten thousandths of an inch.

A pattern 11, which may be that of an electrical circuit, is next applied to the metalized substrate by conventional photoetching methods such as described in copending U.S. application Ser. No. 641,042, filed May 24, 1967 by William F. Watson and now Patent No. 3,457,641 and assigned to The Bendix Corporation, assignee of the present invention. Thus, a suitable photosensitive lacquer is applied over copper film 6, after which the copper film is exposed to light through a generally transparent master having an opaque pattern corresponding to pattern 11. The exposed substrate is immersed in a suitable developing solution for softening the unexposed areas of photosensitive lacquer corresponding to the opaque areas of the master, and the softened areas of photosensitive lacquer are flushed away with water for exposing the copper underneath.

The metalized substrate is next prepared for electroplating a final electroconductive metal film 10 of gold over the exposed copper pattern. This is accomplished by first cleaning the substrate in a manner similar to that performed prior to the copper electroplating with the immersion in sodium cyanide omitted, to wit: brushing in pumice and water, and rinsing and drying; immersing in "Metex L–5"; gently swabbing; re-immersing in "Metex L–5" and draining; rinsing in warm and cold water and thereafter immersing in a 50% solution of hydrochloric acid for one minute; and finally rinsing the substrate in cold water.

The electroplating step commences by applying a gold strike to the copper by immersing it in a suitable bath for a period of 1–2 minutes. The striking bath may be, for purposes of illustration, a commercially available solution such as that carrying the trade designation "Auro-Bond" and manufactured by the Sel-Rex Co. of Nutley, N.J. After gold striking, the metalized substrate is rinsed in water and gold plated in a suitable plating bath such as that carrying the trade designation "Temprex HD," and which plating bath is also manufactured by the Sel-Rex Co., for providing gold film 10 having a thickness of approximately 1 to 2 ten thousandths of an inch.

Upon completion of the gold plating step, the remaining photosensitive lacquer is stripped from substrate 1, and the copper thus exposed is removed by spray etching using a suitable etchant which may be for purposes of example a material manufactured by the Philip A. Hunt Chemical Corp., Palisades Park, N.J., and carrying the trade designation "Multi-Circuit Etch."

The underlaying titanium film is next removed by etching in a solution of 3 parts nitric acid and 1 part hydrofluoric acid for a period of from 2 to 4 seconds. It has been found that this time is critical and should not exceed the noted limit otherwise the entire structure of the metalized substrate will be undermined. After the titanium film has been removed, the metalized substrate is scrubbed with a nylon brush in a solution of pumice and water, and finally rinsed and dryed providing the metalized substrate as shown in FIG. 2.

Metalized substrate 1 may be inspected by conventional methods consistent with its end use. For purposes of illustration, the adhesion of electroplated copper film 6 and gold film 10 may be checked by applying a pressure sensitive tape to the plated surfaces and then rapidly removing the tape. Any appreciable copper or gold pick-up on the tape should be a cause for rejection. Optical inspection may be used to check for pits, scratches or other surface imperfections which might render the metalized substrate ineffective for the uses intended as will now be understood by those skilled in the art.

With reference to FIG. 1, it will be seen that the metallic pattern provided by the aforegoing method provides extremely intricate shapes and angles. This is illustrated by considering, for example, that area 12 on metalized substrate 1 is 0.095 inch long and 0.050 inch wide, and the spacing between area 12 and adjacent areas 16, 18 or 20 is 0.015 inch. Moreover, microcircuit requirements necessitate that these dimensions be held to a tolerance of +.003 inch.

In summation, the invention provides a method for applying an intricate metallic pattern to a ceramic substrate such as may be required in the microcircuit field. A refractory metal such as titanium is vacuum deposited on the ceramic substrate and a primary electroconductive metal such as copper is vacuum deposited over the titanium. The thickness of the copper film is increased by electroplating after which the desired pattern is applied to the copper using photoetching methods. A final electroconductive metal, such as gold, is electroplated over the pattern and excess copper and titanium removed by selective etching to provide the metalized substrate as shown in FIG. 2. The method provides highly accurate and intricate patterns which were heretofore unavailable and represents a distinct advancement in the microcircuitry arts.

Although but a single embodiment of the invention has been illustrated and described in detail, it is to be expressly understood that the invention is not limited thereto. For example, it may be desirable to metallize both sides of the ceramic substrate and the same is within the scope of the invention. Other metallic layers can be either vacuum deposited or electroplated prior to the gold application and various changes may also be made in the arrangement of the steps and materials used without departing from the spirit and scope of the invention as the same will now be understood by those skilled in the art.

What is claimed is:

1. A method for applying intricate electroconductive metallic patterns to a ceramic substrate, comprising the steps of:
applying a refractory metal to the ceramic substrate;
applying a primary electroconductive metal over the refractory metal;
applying the metallic patterns to the primary electroconductive metal;
applying a final electroconductive metal over the patterns; and
removing all metals outside of the patterns to expose the ceramic substrate.

2. A method as described by claim 1, wherein:
the ceramic substrate is aluminum oxide;
the refractory metal is titanium;
the primary electroconductive metal is copper; and
the final electroconductive metal is gold.

3. A method as described by claim 1, wherein the step of applying a refractory metal to a ceramic substrate includes:
cleaning the ceramic substrate in a detergent type cleaner;
baking the cleaned substrate to drive off moisture; and
vacuum depositing the refractory metal on the cleaned substrate.

4. A method as described by claim 3, wherein the step of vacuum depositing the refractory metal includes: sputtering the refractory metal on the substrate in a vacuum.

5. A method as described by claim 3, wherein the step of vacuum depositing the refractory metal includes: evaporating the refractory metal with an electron beam gun in a vacuum.

6. A method as described by claim 1, wherein the step of applying a primary electroconductive metal over the refractory metal includes:
vacuum depositing a layer of the primary electroconductive metal over the refractory metal; and
electroplating additional primary electroconductive metal to increase the thickness of the layer thereof.

7. A method as described by claim 6, wherein the step of vacuum depositing a layer of primary electroconductive metal includes: evaporating the primary electroconductive metal by direct resistance heating in a vacuum.

8. A method as described by claim 7, wherein the step of evaporating the primary electroconductive metal by direct resistance heating includes:
melting the primary electroconductive metal by using a heated filament; and
reducing the heat on the filament when the primary electroconductive metal becomes molten to maintain uniform evaporation of said metal.

9. A method as described by claim 1 wherein, after the step of applying a primary electroconductive metal over the refractory metal, a firing step is included for insuring adhesion between the refractory and primary electroconductive metals, said firing step comprising:
placing the substrate in a furnace initially at room temperature;
introducing hydrogen into the furnace to inhibit oxidation of the primary electroconductive metal;
raising the temperature of the furnace to a predetermined level and maintaining the temperature at said level for a predetermined period, said predetermined temperature and period being in accordance with the characteristics of the metals so as to promote adhesion therebetween; and
furnace cooling the heated substrate to room temperature.

10. A method as described by claim 9 wherein, after the step of firing the substrate, a cleaning step is included, said cleaning step comprising:

brushing the fired substrate in a solution of pumice and water;
rinsing the substrate in water;
drying the substrate;
immersing the substrate in an acid based cleaner for a predetermined period;
swabbing the substrate;
re-immersing the substrate in the acid based cleaner;
draining the substrate;
rinsing the substrate in first warm and then cold water;
immersing the substrate in a 50% hydrochloric acid solution for a predetermined period;
rinsing the substrate in cold water; and
immersing the substrate in a 10% sodium cyanide solution for a predetermined period.

11. A method as described by claim 1, wherein the step of applying the metallic patterns to the primary electroconductive metal includes: photoetching said patterns in the primary electroconductive metal.

12. A method as described by claim 1, wherein the step of applying the final electroconductive metal over the patterns includes: electroplating said final electroconductive metal.

13. A method as described by claim 11, wherein after the step of photoetching said patterns in the primary electroconductive metal, a cleaning step is included, said cleaning step comprising:
brushing the substrate in a solution of pumice and water;
rinsing the substrate in water;
drying the substrate;
immersing the substrate in an acid based cleaner for a predetermined period;
swabbing the substrate;
re-immersing the substrate in the acid based cleaner;
draining the substrate;
rinsing the substrate in first warm and then cold water;
immersing the substrate in a 50% hydrochloric acid solution for a predetermined period; and
rinsing the substrate in cold water.

14. A method as described by claim 1, wherein the step of removing all metals outside of the patterns to expose the ceramic substrate includes: selectively etching away first the primary electroconductive metal and then the refractory metal.

15. A method as described by claim 14, wherein after the primary electroconductive and refractory metals are etched away a cleaning step is included, said cleaning step comprising: brushing the metallized substrate in a solution of pumice and water.

References Cited

UNITED STATES PATENTS

| | | | |
|---|---|---|---|
| 2,912,312 | 11/1959 | Japel | 204—15 |
| 2,958,928 | 11/1960 | Bain, Jr. et al. | 204—15 |
| 3,423,517 | 1/1969 | Arrhenius | 174—68.5 |
| 3,520,054 | 7/1970 | Pensack et al. | 174—68.5 |

OTHER REFERENCES

Electroplating the New Generation of Microelectronic Devices, by E. F. Duffek, Plating, May 1969, pp. 505–510.

Fine Line Patterning of Metalized Ceramics, by E. F. Duffek; Plating, January 1970, pp. 37–42.

A Survey of Vacuum Deposition Technology, by R. H. Dudley, SCP and Solid State Technology, December 1967, pp. 39–44.

HOWARD S. WILLIAMS, Primary Examiner

T. TUFARIELLO, Assistant Examiner

U.S. Cl. X.R.

117—212; 156—8; 174—68.5